United States Patent [19]

Keller

[11] 4,052,616

[45] Oct. 4, 1977

[54] INFRARED RADIATION-BURGLARY DETECTOR

[75] Inventor: Hansjürg Keller, Mannedorf, Switzerland

[73] Assignee: Cerberus AG, Mannedorf, Switzerland

[21] Appl. No.: 738,846

[22] Filed: Nov. 4, 1976

[30] Foreign Application Priority Data

June 30, 1976  Switzerland .......................... 8330/76

[51] Int. Cl.² .............................................. G01J 1/00
[52] U.S. Cl. .................................... 250/353; 250/221; 250/227; 250/342
[58] Field of Search ............... 250/338, 340, 342, 353, 250/221, 227; 340/258 B

[56] References Cited

U.S. PATENT DOCUMENTS

| 3,792,275 | 2/1974 | Leftwich et al. ................. 250/342 X |
| 3,829,693 | 8/1974 | Schwarz ........................... 250/342 X |
| 3,999,062 | 12/1976 | Demsky et al. ....................... 250/227 |
| 3,999,864 | 12/1976 | Mutter ............................. 250/227 X |

*Primary Examiner*—Davis L. Willis
*Attorney, Agent, or Firm*—Werner W. Kleeman

[57] ABSTRACT

An infrared radiation-burglary detector comprising radiation-focusing means and a radiation receiver. A bunch of radiation-conducting elements is provided, the radiation inlet openings of which are arranged at the focal surface of the radiation-focusing means and the radiation outlets of which are arranged in front of the radiation receiver.

26 Claims, 4 Drawing Figures

INFRARED RADIATION-BURGLARY DETECTOR

BACKGROUND OF THE INVENTION

The present invention relates to a new and improved construction of an infrared radiation-burglary detector — also referred to in the art as an infrared intrusion detector — of the type comprising radiation-bundling or focusing means and a radiation receiver.

Such detectors serve to detect objects or the entry of intruders or unauthorized individuals, for instance a burglar, into a protected area or room by detecting the infrared radiation emitted by the object or individual. Such radiation can be constituted by the inherent thermal radiation of the object or the individual, for instance in a range between 4 $\mu$ and 20 $\mu$, preferably between 7 $\mu$ and 14 $\mu$, or there can be provided a radiation source, the radiation of which is reflected by the object or individual to be detected. In the latter case there also can be utilized radiation in the near infrared region, so that there also may be employed components, such as lenses, filters and so forth, which at the far infrared region already exhibit an appreciable radiation absorption.

In order to be able to detect even the slightest movements it has been found to be advantageous to divide the protected room or area into a number of separate receiving regions or fields of view, which are separated from one another by dark zones or fields. If an intruder moves within an area or room protected in this manner, then, it will unavoidably happen that such individual will pass through one or a number of boundaries of the receiving region. At the outlet of the radiation receiver there appear pulse-shaped signals or a signal of varying amplitude. By means of a conventional evaluation circuit these output signals of the radiation receiver can be evaluated for the purpose of delivering an alarm signal.

In the case of prior art infrared radiation-burglary detectors employing a number of separate receiving regions there is generally provided a predetermined pattern of receiving directions, receiving cones or receiving strips. While such detectors can be adjusted into given directions by means of a pivot device or the like, however, there is not possible any individual accommodation and adjustment to individual receiving directions or regions. Therefore, such detectors, generally cannot be accommodated individually to given fields of application.

According to a heretofore known infrared radiation-burglary detector of this type, the different receiving regions are produced by a multiplicity of reflectors which take-up the radiation emanating in each case from one receiving direction and focus the same upon a common radiation receiver. It is conceivable to construct the individual reflectors to be adjustable, however this would require an exceedingly complicated and expensive construction. Additionally, it is necessary to optically correct the individual reflector surfaces depending upon the angle of incidence and angle of reflection, so as to obtain good bundling or focusing, and thus, cleanly separated receiving regions having relatively sharply defined boundaries. The spherical mirrors used with state-of-the-art detectors, at best, are only poorly suitable for this purpose, especially when working with a flat reflection angle. To this end it would be necessary to choose an eccentric section from a paraboloid of revolution, and such section must be chosen with increasingly greater eccentricity the flatter the reflection angle, i.e. for each individual receiving direction there must be selected a different paraboloid-section. With heretofore known detectors employing spherical mirrors or reflectors or centric paraboloid-reflectors the lateral receiving regions, in the case of more pronounced reflection inclination, indistinctively merge with one another at the boundaries. Such prior art detectors, even if the reflectors are constructed to be adjustable, only would be poorly suitable for positively detecting an intruder within a large spatial angular region of a room due to the inadequate optical structure.

SUMMARY OF THE INVENTION

Hence, it is a primary object of the present invention to provide a new and improved construction of infrared radiation-burglary detector or infrared intrusion detector which is not associated with the aforementioned drawbacks and limitations of the prior art constructions.

Another and more specific object of the present invention aims at overcoming the aforementioned drawbacks and providing an infrared radiation-burglary detector having a number of separate receiving regions while using only a single reflector, the individual receiving regions are optionally adjustable and can be easily accommodated to desired fields of application, and wherein, the quality of the optical bundling or focusing is independent of the irradiation- or receiving direction.

Now in order to implement these and still further objects of the invention, which will become more readily apparent as the description proceeds, the invention is manifested by the features that there are provided a bundle or bunch of radiation-conducting elements, the radiation inlet openings of which are located at the focal surface of the radiation-focusing means and the radiation outlets of which are arranged in front of the radiation receiver.

It is particularly advantageous if the radiation-focusing means are constructed as internally reflecting spherical surfaces, and the focal surface is constituted by a sphere of half-radius, the radiation receiver is arranged approximately at the center of the sphere and the length of the radiation-conducting elements chosen such that they correspond to half the reflector-sphere radius. Consequently, the inlet openings of such radiation-conducting elements, during bending, always automatically come to lie in each position at the focal surface.

In order to obtain a burglary or intrusion detector having good panoramic sensitivity, and which can absorb radiation approximately from an entire half room, it is advantageous to construct the reflector as an internally reflectively coated hemisphere. Such type detector can be employed, for instance, as a ceiling alarm arranged at the center of the ceiling of a protected room or area. The optical correction and the quality of the image are independent of the irradiation direction.

According to one embodiment of the invention it is possible, by providing a flexible construction of the radiation-conducting elements to insure that each random receiving region pattern can be individually adjusted, depending upon requirements encountered in practice. The number of receiving regions is determined by the number of radiation-conducting elements contained in the bunch or bundle. In practice it is possible in this manner to produce a considerably greater number of receiving regions than with a number of different reflectors which require a considerable amount of space and the number of which therefore is limited. In this way, the protected room or area can be considerably better covered by radiation receiving regions.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
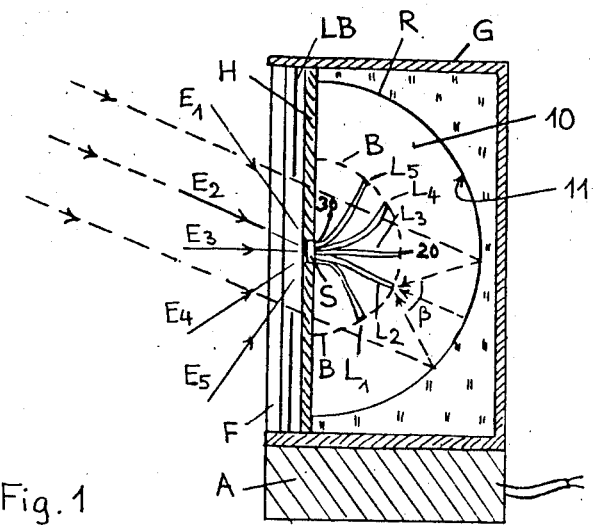
FIG. 1 schematically illustrates in sectional view a first exemplary embodiment of infrared radiation-burglary detector or infrared intrusion detector constructed according to the present invention.
Figure 2:
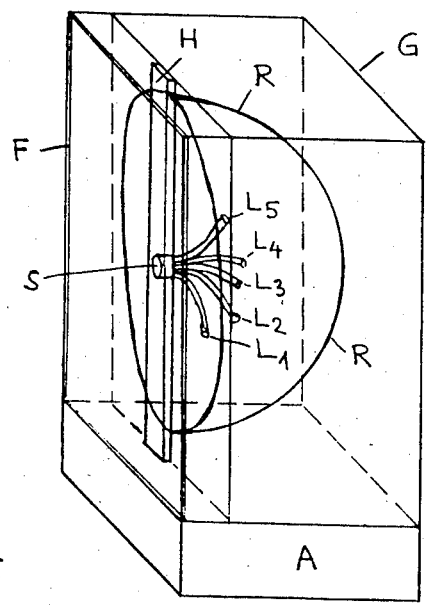
FIG. 2 is a perspective view of the arrangement of FIG. 1.

Referring now to the drawings, with the exemplary embodiment illustrated in FIGS. 1 to 4 a reflector surface R is arranged in a housing G constructed as part of a spherical surface. The selected part of the sphere governs the detectable spatial angle. In the event there is desired a sensitivity which falls within as large as possible spatial region, it is advantageous to employ a hemisphere. The spherical surface R can be constructed as a metallic reflector or as an internally reflectively coated plastic- or glass portion with a substantially spherical-shaped cavity 10. The reflective coating 11 may be found, for instance, of silver or aluminum.

At the center of the sphere there is arranged a radiation receiver S by means of a holding bracket or web H which only screens very little radiation. The spectral sensitivity of the radiation receiver S is matched to the employed wavelength range. A selective sensitivity for a certain spectral range also can be achieved by forwardly arranging a filter F, constructed for instance as a cover disk for the device at the housing front wall and/or the radiation receiver.

At the front of the radiation receiver S, confronting the reflecting spherical surface R, there is mounted a radiation-conducting bundle consisting of a multiplicity or bunch of individual radiation-conducting elements, for instance there being shown by way of example five such elements $L_1$, $L_2$, $L_3$, $L_4$ and $L_5$. The length of each of the individual elements $L_1$ to $L_5$ is chosen such that it approximately corresponds to one-half of the sphere radius. In this instance, the radiation inlets 20 of the individual elements $L_1$, $L_2$, $L_3$ . . . lie along a sphere of half radius (half the radius of spherical surface R), which approximately constitutes the focal surface B of the reflector sphere R.

The individual radiation-conducting elements $L_1$ to $L_5$ are constructed, for instance, to be flexible or bendable, so that they can be easily bent and their radiation inlets can be optionally adjusted to come to lie at such spherical-shaped focal surface. The individual radiation-conducting elements can be constructed as fibers or rods formed of glass or plastic possessing adequate radiation permeability, depending upon the employed wavelength, and within which there is propagated the radiation, by total reflection at the surface or by reflection at an additionally provided reflecting layer. The individual radiation-conducting elements also can consist of a multiplicity of such rods or fibers of the aforementioned type. One such construction, for instance in the form of glass fiber bundles, is already used in practice as light conductors. Depending upon the wavelength it can be advantageous, instead of using solid and therefore possibly markedly absorbing radiation-conducting elements, to construct such as internally reflecting or coated hollow bodies, for instance tubes, or as waveguides for electromagnetic waves, in the manner as such are useful in microwave technology, with walls formed of good conductive metal and/or dielectric material, typically for instance glass or plastic. The cross-section of such radiation-conducting elements, at the end located at the focal plane, corresponds to the requirements placed upon the size of the focal point, for instance extremely small and round, and at the other side exhibits the same cross-section or a cross-section, for instance rectangular, accommodated to the size of the radiation receiver. The radiation-conducting elements in the extended or stretched condition, in the simplest case, therefore exhibit a prismatic construction, for instance in the form of circular or round rods, with an accommodation to the size of the focal point and that of the radiation receiver a conical or pyramid construction or, in the general case, the form of a body having an inlet surface and an outlet surface, wherein the jacket or shell is constructed simply such that incident radiation must in some manner reach the outlet. It therefore also can be advantageous to design the cross-section of the radiation-conducting elements from the standpoint of optimum permeability or optimum bending, for instance band-shape, and to only provide at the ends transition elements to the desired cross-section. Instead of the five elements $L_1$ . . . $L_5$, shown in the drawings for the sake of improving the illustration, there can be used a light conductor bundle consisting of a large number of fibers, for instance more than 100.

By means of each of the individual elements $L_1$ . . . $L_5$ there is fixed a radiation receiving direction $E_1$ . . . $E_5$ corresponding to the connection lines between the inlets 20 of the light conductors $L_1$ . . . $L_5$ and the sphere center point i.e. the location of the radiation receiver S. At this location there are disposed the radiation outlets 30 of the radiation-conducting elements. Due to the described arrangement there is achieved the result that only radiation emanating from such mutually separate receiving directions is focused by means of the spherical reflector R upon one of the radiation-conducting elements $L_1$ . . . $L_5$ and thus delivered to the radiation receiver S, not however radiation from other receiving directions. There is thus formed a receiving direction pattern which corresponds to the distribution of the radiation inlets 20 of the individual elements at the focal surface B. This pattern can be easily and comfortably adjusted and accommodated to the desired fields of application.

Additionally, due to this arrangement there is achieved the result that the optical correction is completely independent of the receiving direction. The section of the reflector which is effective for each receiving direction and thus the quality of the optical image is determined by the spatial angle $\beta$ at which the radiation-conducting element can absorb and further propogate radiation from the direction of the reflector R. This spatial angle $\beta$ and thus the image errors caused by the spherical aberration can be limited by means of an aperture or diaphragm LB, or by constructing the radiation inlets of the radiation-conducting elements $L_1$ ... $L_j$ so as to have an appropriate directional characteristic. In this way there also can be achieved the result that not only does the central receiving region possess a defined boundary, but all receiving directions, even those with pronounced inclined radiation incidence. In this way there is insured that the evaluation circuit A mounted at the base responds with extreme sensitivity and triggers an alarm, even when passing through a markedly laterally aligned receiving direction. A sensitivity loss externally of the central region is thus practically completely eliminated.

Instead of constructing the radiation-conducting elements to be flexible or bendable, so that they can be bent in the detector itself and aligned with the desired receiving directions, there also could be chosen for this purpose a material which only after undergoing a certain treatment, for instance by increasing its temperature, becomes bendable, thereafter however again solidifies, so that the receiving directions are fixed. There also can be used rigid radiation-conducting elements which, upon mounting at the radiation receiver by any suitable means, can be aligned with the desired receiving directions and thereafter, for instance by casting, fixed in this position. The alignment of the elements can be undertaken in all of the mentioned cases both in the finished mounted detector as well as before or during assembly. Thus, for instance, there can be mounted in the housing or the reflector a previously finished aligned element bundle, if desired, together with the radiation receiver.

Figure 3:
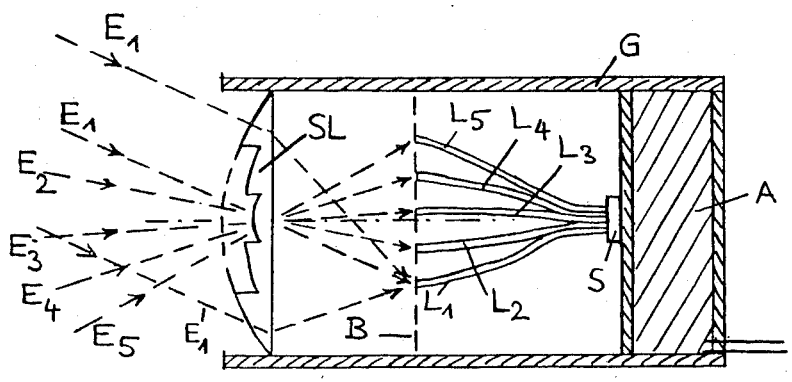
FIG. 3 is a sectional view of a further embodiment of the invention.
Figure 4:
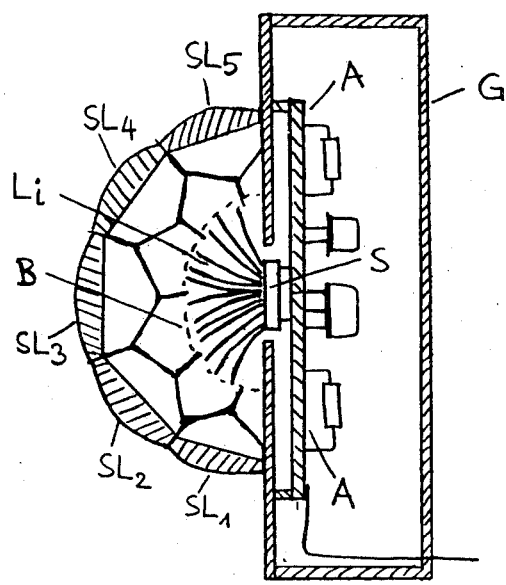
FIG. 4 illustrates in sectional view yet another embodiment of the invention.

It is remarked that instead of a reflector sphere there also can be provided other radiation-bundling means with equivalent effect, for instance a collecting lens which also can be constructed as an echelon lens or Fresnel lens, or a number of lenses assembled together in a honeycombed configuration, at the focal surface of focal plane of which there are located the individual radiation conducting openings. In FIGS. 3 and 4 there are illustrated such detectors with an echelon lens SL and a number or facet-shaped individual lenses $SL_1$, $SL_2$..., respectively, arranged at a sphere. The remaining components correspond to those shown in FIG. 1. The inlet ends of the respective radiation conductors $L_1, L_2 \ldots L_i$ again are located at the focal plane B (FIG. 3), and the sphere B (FIG. 4) assembled together from the focal surfaces of the individual facets. The outlet ends of such respective radiation-conducting elements or conductors are here also located adjacent the associated radiation detector S.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. An infrared radiation-burglary detector comprising radiation-focusing means having a focal surface, a radiation receiver, a bundle of radiation-conducting elements having radiation inlet openings and radiation outlet openings, the radiation inlet openings being located substantially at the focal surface of the radiation-focusing means and the radiation outlet openings being located in front of the radiation receiver.

2. The detector as defined in claim 1, wherein the radiation-focusing means are defined by part of an internally reflecting spherical surface, the radiation inlet openings being arranged at the focal surface of the spherical surface, said focal surface comprising a spherical surface of approximately half the radius of said internally reflecting spherical surface of said radiation-focusing means.

3. The detector as defined in claim 2, wherein the radiation receiver is arranged approximately at the center of the internally reflecting spherical surface, the radiation-conducting elements each are of approximately the same length.

4. The detector as defined in claim 3, wherein the radiation receiver is arranged at the center of the sphere defined by at least part of the spherical surface, and the radiation-conducting elements possess a length which approximately corresponds to half of the radius of the sphere.

5. The detector as defined in claim 2, wherein the radiation receiver is arranged at the center of the sphere defined by at least part of the spherical surface, and the radiation-conducting elements possess a length which approximately corresponds to half of the radius of the sphere.

6. The detector as defined in claim 2, wherein the radiation-focusing means comprises a body having an internally reflecting cavity and constituting part of a sphere.

7. The detector as defined in claim 6, wherein the body is formed of plastic.

8. The detector as defined in claim 6, wherein the body is formed of glass.

9. The detector as defined in claim 2, further including diaphragm means arranged in front of the radiation-focusing means.

10. The detector as defined in claim 2, wherein the radiation-focusing means comprises a hemisphere.

11. The detector as defined in claim 10, further including diaphragm means arranged in front of the radiation-focusing means.

12. The detector as defined in claim 10, wherein the radiation receiver is arranged at the center of the hemisphere and the radiation-conducting elements possess a length which approximately corresponds to half of the radius of the hemisphere.

13. The detector as defined in claim 10, wherein the radiation-receiver is arranged approximately at the center of the hemisphere, the radiation-conducting elements each are of approximately the same length.

14. The detector as defined in claim 1, further including diaphragm means arranged in front of the radiation-focusing means.

15. The detector as defined in claim 1, wherein the radiation-focusing means comprises a collecting lens.

16. The detector as defined in claim 15, wherein the collecting lens is an echelon lens.

17. The detector as defined in claim 1, wherein the radiation-focusing means comprises a number of facet-shaped collecting lenses arranged at a substantially spherical surface, said collecting lenses having focal surfaces which at least approximately adjoin one another to form a spherical surface.

18. The detector as defined in claim 17, wherein the facet-shaped arranged collecting lenses assume the configuration of approximately a hemisphere.

19. The detector as defined in claim 17, wherein the radiation receiver is arranged approximately at the center of said spherical surface, the radiation-conducting elements each are of approximately the same length.

20. The detector as defined in claim 19, further including diaphragm means arranged in front of the radiation-focusing means.

21. The detector as defined in claim 18, wherein the radiation receiver is arranged approximately at the center of the hemisphere, the radiation-conducting elements each are of approximately the same length.

22. The detector as defined in claim 1, wherein the radiation-conducting elements comprise optical fibers of a radiation pervious material within which there occurs conductance of the radiation by means of an internal total reflection.

23. The detector as defined in claim 1, wherein the radiation-conducting elements are constructed as internally-reflecting tubes of predetermined cross-section.

24. The detector as defined in claim 1, wherein the radiation-conducting elements comprise waveguide means for electromagnetic waves.

25. The detector as defined in claim 1, wherein the radiation inlets of the radiation-conducting elements possess directional characteristic.

26. The detector as defined in claim 1, wherein the radiation-conducting elements are flexible.

* * * * *